Sept. 14, 1965    C. A. HEADLEY ETAL    3,205,734
PORTABLE TOOL
Filed Dec. 3, 1962
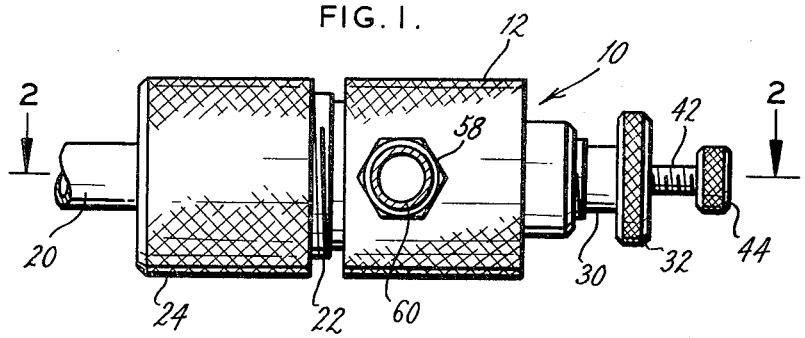
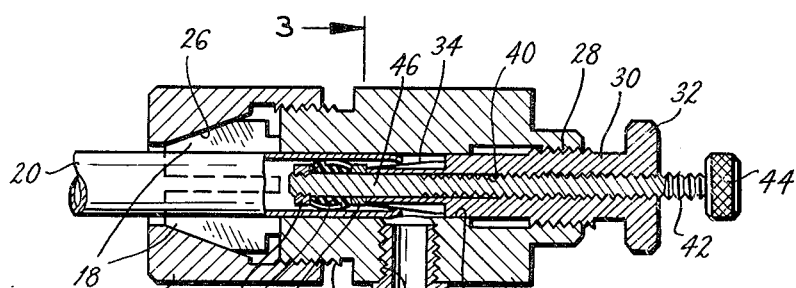
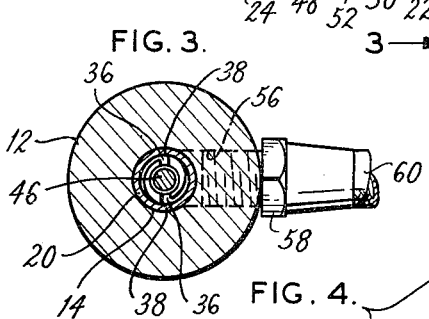
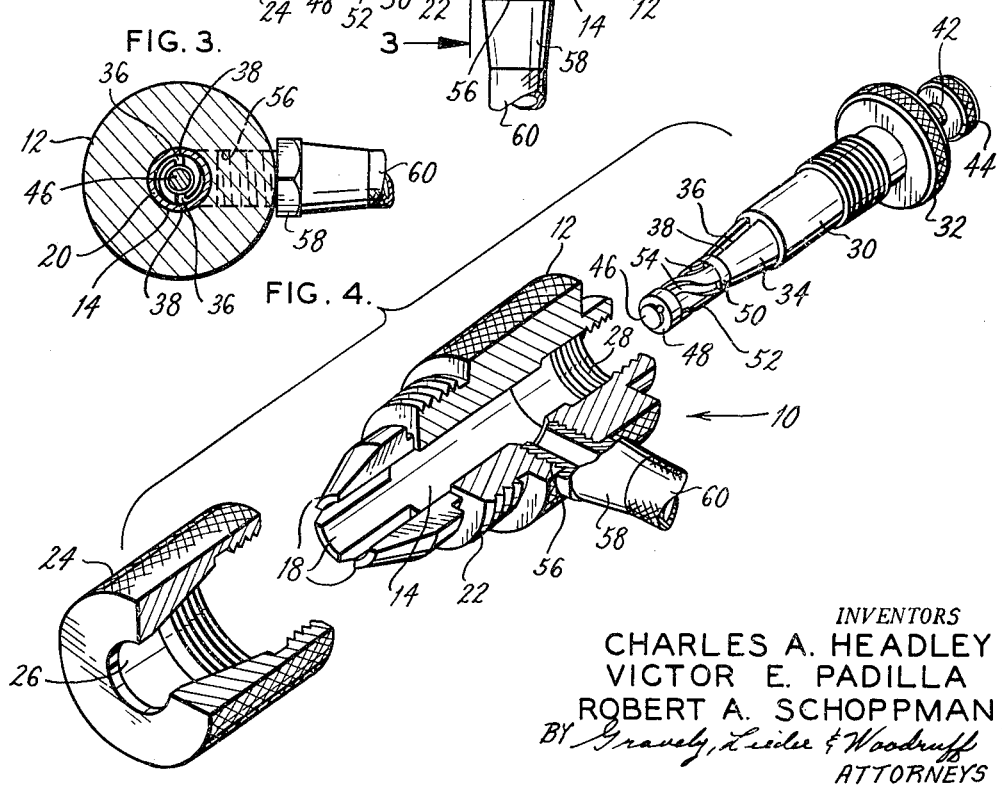
INVENTORS
CHARLES A. HEADLEY
VICTOR E. PADILLA
ROBERT A. SCHOPPMAN
BY *Gravely, Lieder & Woodruff*
ATTORNEYS

United States Patent Office 3,205,734
Patented Sept. 14, 1965

3,205,734
PORTABLE TOOL
Charles A. Headley, Alton, Ill., Victor E. Padilla, St. Louis County, and Robert A. Schoppman, Florissant, Mo., assignors by mesne assignments, to Aeroquip Corporation, Jackson, Mich.
Filed Dec. 3, 1962, Ser. No. 241,732
8 Claims. (Cl. 77—73)

The invention described herein was made in the performance of work under a NASA contract and is subject to the provisions of the National Aeronautics and Space Act of 1958, Public Law 85–568 (72 Stat. 426; 42 U.S.C. 2451), as amended.

The present invention relates generally to portable tools and more particularly to portable tools for accurately preparing the ends of tubular members and the like including removing burrs and other undesirable projections which might interfere with or cause a malfunction of a system in which the tubular member is to be connected.

In systems where tubular members or conduits are used, it is frequently necessary to make changes, repairs and improvements which require disconnecting and reconnection tubes and fittings. In some systems it is important to accurately prepare the parts to be connected, and it is often necessary to perform the work at the work site under conditions of limited access and limited space. These conditions for the most part require portable equipment of special construction. Furthermore, whenever a tube or conduit is severed an undesirable burr is formed around the inner end edge and it is usually desirable if not essential to remove the burr before reconnecting the tube. To some extent the type of system in which the connection is to be made and the expected pressures dictate the accuracy to which the parts must be prepared. In many systems in use at this writing, for example, it is extremely important that the internal flow path of tubes and conduits be unobstructed and that there be no rough edges, burrs or other obstructions which might interfere or cause a malfunction in the system. This is true of any fluid system such as might be used in airborne, ground, or marine systems, and the like. Therefore, whenever a tube or conduit is severed leaving a burr around the inner end edge, it is desirable that the burr be removed with accuracy and precision and that the work be performed at the work site.

No one heretofore has devised a simple portable tool capable of being operated in areas of limited space and access to remove burrs and other undesirable projections and obstructions from tube and pipe ends nor has anyone heretofore devised means for carrying away the residue removed during preparation of a pipe end.

The present tool overcomes these and other disadvantages and shortcomings of the known prior art devices by teaching the construction of a simple portable hand tool comprising a first member having an opening therethrough for receiving a tube or pipe to be deburred, a second member threadedly engaged with the first member and adapted upon movement in one direction thereof on the first member to clamp said first member onto an end portion of a tube or pipe positioned therein with the end of the tube or pipe at an intermediate position in the tool, a deburring member having a tapered head end adapted to be moved into cutting of planishing engagement with the tube end, said deburring member being positioned in the tube passage adjacent to the tube end and having a threaded connection with the first member for advancing said head end into cutting or planishing engagement with the tube end, a threaded passage through the reburring member including the head portion thereof, a threaded rod positioned in said passage and extending from the ends thereof, said rod having a pair of spaced relatively movable discs on the end adjacent to the tapered head end of the deburring member and a knob on the opposite end, a grooved flexible member positioned on the rod between the spaced discs, said flexible member being of small enough diameter to move into the tube when in unstressed condition, and said flexible member expanding outwardly to frictionally engage the inside of the tube when the threaded rod is turned in the deburring member in a direction to move one of the spaced discs toward the other to compress the flexible member therebetween, and means for moving a mass of air through the tube past the flexible member to carry away residue removed during a deburring operation.

A main object of the present invention is to provide a portable tool of simple and inexpensive construction for preparing the ends of tubes and pipes.

Another object is to provide portable means for preparing tube and pipe ends in locations of limited space and access.

Another object is to provide means for accurately forming tube and pipe ends to be joined.

Another object is to provide means for improving connections between tubes, pipes, fittings and other similar devices.

Another object is to provide means for carrying away the residue removed during a tooling operation.

Another object is to provide means for accurately loading reaming or planishing tools.

Another object is to provide a tool for accurately preparing tube and pipe ends which requires little or no special skill or training to operate.

Still another object is to provide a lightweight compact tool which is readily adaptable to being made by existing equipment and methods.

These and other objects and advantages of the subject tool will become apparent after considering the following detailed specification of a preferred embodiment, in conjunction with the accompanying drawing, wherein:

FIG. 1 is a side elevational view of a tool constructed according to the present invention;

FIG. 2 is a cross-sectional view taken on line 2—2 of FIG. 1;

FIG. 3 is a cross-sectional view taken on line 3—3 of FIG. 2; and

FIG. 4 is an exploded view, partly in section, of the subject tool.

Referring to the drawing more particularly by reference numbers, number 10 refers generally to a tool constructed according to the present invention. The tool 10 includes a main portion 12 of cylindrical form with a passage 14 extending longitudinally therethrough. One end of the portion 12 includes a plurality of spaced tapered splines 18 which receive a tube 20 to be deburred as shown in FIG. 2.

The main portion 12 of the tool also has an outside threaded end portion 22 which cooperatively receives a second tool portion 24. The portion 24 as a tapered annular inner surface 26 which cooperates with the tapered splines 18 when the portion 24 is screwed onto the portion 12. This in turn moves the splines 18 inwardly into engagement with the tube 20.

The opposite end of the main tool portion 12 from the splines 18 includes an enlarged internally threaded portion 28 which receives an operating member 30. The operating member 30 is also tubular and has a knob 32 on one end and a tapered tool element 34 on the opposite end. The tool element 34 may be in the form of a planisher with a plurality of spaced grooves 36, with adjacent operating edges 38, or it can be more nearly in the nature of a conventional reaming tool. In either case the tool element is tapered and is movable into engagement with the inner end edge of a tube or pipe by turning the knob 22.

The operating member 30 has a threaded passage 40 therethrough and receives therein another threaded member 42. The member 42 has a knob 44 on the outer end, and a shaft portion 46 on the opposite end which extends from the tool element 34 of the cutter member 30 into the tube 20. The shaft portion 46 has a fixed disc 48 attached to adjacent to its end and a second disc 50 which is spaced from the disc 48. The disc 50 is slidable axially on the shaft 46. An annular flexible resilient member 52 is positioned on the shaft 46 between the fixed disc 48 and the movable disc 50. The member 52 is provided with a plurality of spaced grooves or notches 54 in its outer surface, and when the member 52 is in an unstressed condition on the shaft 46 (FIG. 4) its outer surface is about in alignment with the outer surfaces of the discs 48 and 50. In the unstressed condition the discs 48 and 50 and the flexible member 52 can freely enter the tube 20. However, when the flexible member 52 is in the tube 20, and the knob 44 rotated to retract the shaft 46 from the rear of the operating member 30, the movable disc 50 will move against the adjacent end of the operating member 30 and further turning of the shaft will slide the disc 50 toward the disc 48 and compress the member 52 therebetween. This in turn will cause the center portion of the member 52 to bow or bulge outwardly into engagement with the inner surface of the tube 20. Even with the member 52 bulged outwardly, however, the grooves 54 will provide passages past the member 52 for reasons which will be shown.

The tool portion 12 is also provided with a threaded bore 56 through one side. The bore 56 receives a fitting 58 (FIGS. 2–4) which is in turn connected to a conduit 60. The opposite end of the conduit 60 is connected to a vacuum source (not shown). The vacuum line provided by conduit 60 carries away residue removed by the tool during the operation, and for this reason the bore 56 is located near where the operation takes place. It will also be noted that the end of the tool 10 associated with the knobs 32 and 44 is substantially closed to prevent loss of suction through the tool. The other end of the tool, however, that is located in the tube, including the passage formed by the groves 54 in the flexible member 52 and the tube itself form passage means through which air can pass the tapered tool element 34 and out the conduit 60. A pressure source may also be connected to the tube 20 at the same remote locations to assist the action of the vacuum source.

The tool 10 is operated by moving it onto the end of a tube with the members 12 and 24 loosely engaged. At this time the member 52 is unstressed and slides into the tube. After the tool is properly located on the tube the member 24 is turned on the member 12 to bend the splines 18 into engagement with the tube. Next the knob 44 is turned in the operating member 30 while the operating member remains stationary to move the disc 50 toward the disc 48 and to thereby compress and bulge the member 52 outwardly into engagement with the inner tube surface. Finally, the operating member 30 is turned using the knob 32. This advances the tool element 34, which can be a reamer or planisher, into cutting or planishing engagement with the burned end edge of the tube 20. Further turning of the knob 32 produces a cutting or planishing action which is opposed by the force of the engagement between the splines 18 on the outer surface of the tube. Therefore, by properly adjusting the tightening of the member 24 on the member 12 the operating member pressure can be adjusted. At the same time the cutting or planishing is taking place the flexible member 52 is sliding and wiping on the inner surface of the tube and also offering some resistance to the advance of the operating member. Furthermore, while the tool is operating the suction conduit 60 is drawing a stream of air from the end of the tube past the tool element 34 to carry away the fragments being removed by the tool.

It is therefore apparent that the subject tool provides extremely accurate means for forming the ends of tubular members and the like, and at the same time maintains a condition of cleanliness of the tube and also provides means for precisely regulating the forming pressure.

Thus there has been shown and described novel means for forming and shaping tube and pipe ends and the like which fulfills all of the objects and advantages sought therefor. Many changes, modifications, variations and different uses for the subject tool, however, will become apparent to those skilled in the art after considering this specification and the accompanying drawing. All such changes, modifications, variations and other uses which do not depart from the spirit and scope of the invention are deemed covered by the invention which is limited only by the claims which follow.

We claim:

1. A portable tool for operating on tube ends and the like comprising a tubular member having a passage therethrough for receiving a tube, frictional engaging means coupled with the tubular member for contacting the outer surface of such tube to retain such tube within a portion of the passage in the tubular member, an operating member including a tool member rotatably positioned in said tubular member and movable axially into operating engagement with the tube, a resilient flexible member carried by said operating member and rotatable therewith extending into the tube, means to compress the flexible member against the tool member bulging said flexible member outwardly into engagement with the inner surface of the tube, and a fluid through passage from the tube through the tubular member defined partly by the flexible member and partly by the operating member along the tool member.

2. The portable tool defined in claim 1 wherein the flexible member has axially extending surface channels formed therein to provide a portion of the fluid through passage.

3. The portable tool defined in claim 1 wherein said tool member is a tapered tool engageable with the tube end.

4. The portable tool defined in claim 1 wherein said tool member is a tapered planisher member engageable with the tube end.

5. The portable tool defined in claim 1 wherein said tool member is a tapered cutter member engageable with the tube end.

6. The portable tool defined in claim 1 wherein said cutter tool is a reamer member engageable with the tube end.

7. The portable tool defined in claim 1 wherein the operating member includes an axial threaded bore throughout its length which threadedly receives an operating rod member adapted to compress the flexible member against the tool member.

8. The portable tool defined in claim 7 wherein said flexible member has axially extending surface channels formed therein defining a portion of the fluid through passage.

References Cited by the Examiner

UNITED STATES PATENTS

| | | | |
|---|---|---|---|
| 1,451,610 | 4/23 | Gestas. | |
| 1,678,712 | 7/28 | Smith. | |
| 1,902,194 | 3/33 | Sunnen. | |
| 2,359,931 | 10/44 | Moffit | 29—1.32 |
| 2,552,998 | 5/51 | Norton | 90—12 |
| 2,682,181 | 6/54 | Toth et al. | 77—2 |
| 2,933,418 | 7/61 | Doane | 90—12 |

WILLIAM W. DYER, Jr., *Primary Examiner.*

JOHN C. CHRISTIE, *Examiner.*